United States Patent

Lin

[11] Patent Number: 6,152,176
[45] Date of Patent: Nov. 28, 2000

[54] AIR VALVE STRUCTURE FOR ALTERNATELY AERATED THREE-PIPE STYLE AIR BED

[76] Inventor: Joenne Lin, No.81, Rong Xing Street, Ping Zhen City,Tao Yuan, Taiwan

[21] Appl. No.: 09/336,346

[22] Filed: Jun. 18, 1999

[30] Foreign Application Priority Data

Oct. 9, 1998 [TW] Taiwan ................................. 87216745

[51] Int. Cl.[7] .................................................. A47C 27/08
[52] U.S. Cl. ............................... 137/625.21; 137/624.11; 137/625.17; 137/625.18; 5/710
[58] Field of Search .......................... 137/624.11, 624.13, 137/624.18, 625, 625.17, 625.18, 625.19, 625.2, 625.21, 625.22, 625.23; 5/713, 710

[56] References Cited

U.S. PATENT DOCUMENTS

| | | | |
|---|---|---|---|
| 4,982,466 | 1/1991 | Higgins et al. | 5/713 |
| 5,152,319 | 10/1992 | Hannagan et al. | 137/102 |
| 5,375,273 | 12/1994 | Bodine, Jr. et al. | 5/715 |
| 5,904,172 | 5/1999 | Gifft et al. | 5/710 X |
| 6,014,784 | 1/2000 | Higgins et al. | 5/713 |

*Primary Examiner*—Kevin Lee
*Attorney, Agent, or Firm*—Pro-Techtor International Services

[57] ABSTRACT

An air valve structure for an alternately aerated three-pipe style air bed, being comprised of an upper rotation seat and a lower rotation seat, three air pipes on the air valve structure can be supplied with air through relative rotation between and by the unique structural design of the upper rotation seat and the lower rotation seat,

4 Claims, 14 Drawing Sheets

AIR VALVE STRUCTURE FOR ALTERNATELY AERATED THREE-PIPE STYLE AIR BED

BACKGROUND OF THE INVENTION

1. Field of the Invention

The present invention is related to an air valve structure for an alternately aerated three-pipe style air bed. And especially to an air valve structure for an air bed having three sets of mutually separated elongate air bladders which can be alternately aerated, discharged or can be all aerated.

2. Description of the Prior Art

A conventional air bed is generally provided with two sets of elongate air bladders. The air bladders are operated like this: the air bladders are both aerated, or the air bladders of odd number are aerated while the air bladders of even number are discharged, or the airbladders of odd number are discharged while the air bladders of even number are aerated. However, the conventional air bed only provided with two sets of elongate air bladders does not meet the practical requirement in consideration of the contact areas of the body of a patient with the air bed. In view of this, an air bed provided with three sets of mutually separated elongate air bladders capable of alternate aeration and discharging is requisite to reduce the distances between every two air bladders being aerated and to more effectively change contact areas of the body of a patient with the air bed to lower the chance of getting decubitus.

SUMMARY OF THE INVENTION

Therefore, the inventor studied and has developed the present invention to obtain a novel air valve, especially a novel air valve used on an air bed provided with three sets of mutually separated elongate air bladders capable of alternate aeration and discharging of part of the air bladders or aeration of all air bladders.

The object of the present invention is to provide an air bed structure which is provided at least with three air pipes. The three air air pipes are connected respectively to the three sets of mutually separated elongate air bladders. In this way, by rotation of the air valve, the object to alternately aerate and discharge part of or aerate all the air bladders can be achieved.

The present invention will be apparent in its composition of structure and the effect created after reading the detailed description of the preferred embodiment thereof in reference to the accompanying drawings.

DETAILED DESCRIPTION OF THE PREFERRED EMBODIMENT

Figure 1:
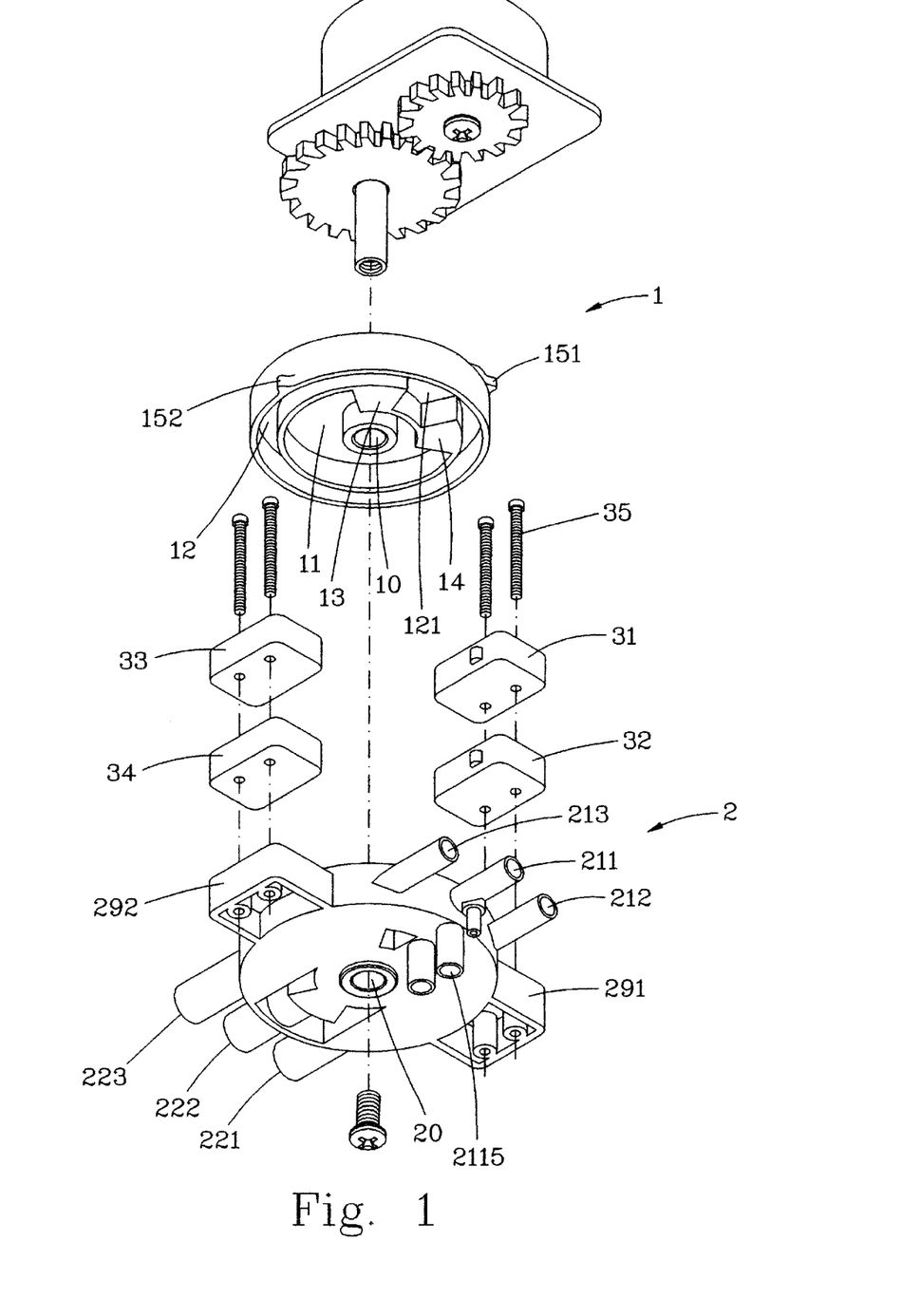
FIG. 1 is an analytic perspective view of the present invention.
Figure 2:
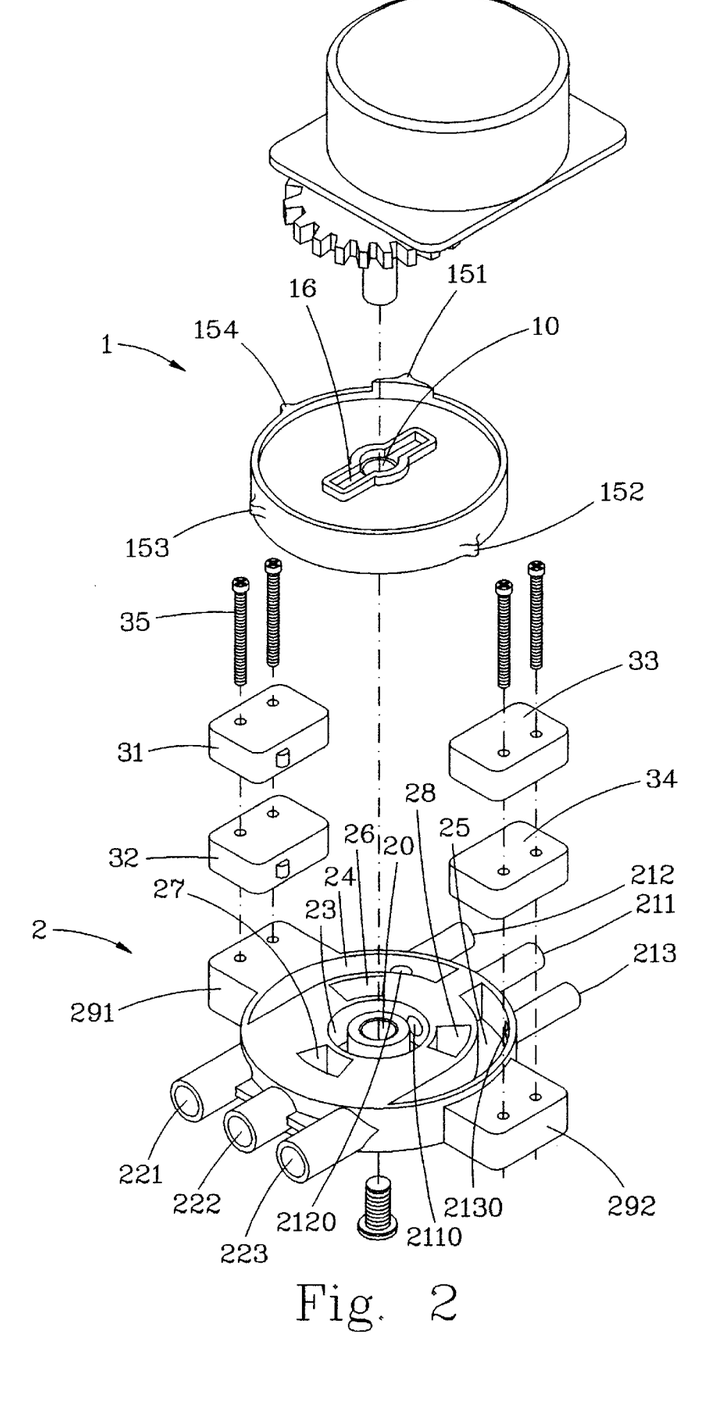
FIG. 2 is another analytic perspective view of the present invention.
Figure 3:
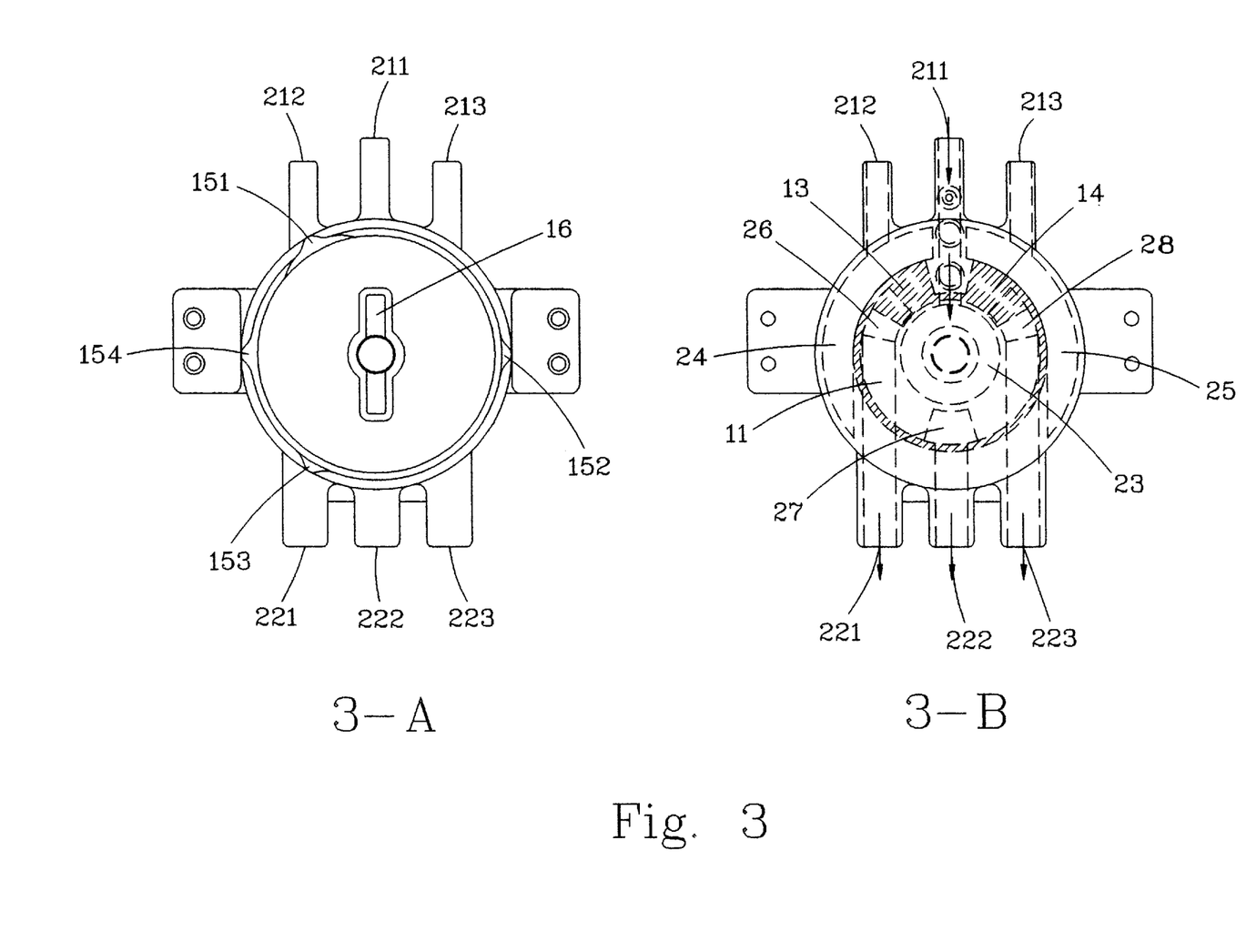
FIG. 3 (including FIGS. 3-1 and 3-2) is a schematic view showing operation of the structure of the present invention.

Referring to FIGS. 1, 2 and 3, the air valve of the present invention is comprised mainly of an upper rotation seat 1, a lower rotation seat 2 and a plurality of micro-switches 31, 32, 33 and 34.

Wherein, the upper rotation seat 1 is placed over the lower rotation seat 2, the top of the upper rotation seat 1 is a sealed plane surface and is provided with an upper axle hole 10. The bottom of the upper axle hole 10 is surrounded by an upper inner intake chamber 11 which is surrounded by an upper external discharge chamber 12. Two stop blocks 13, 14 are provided between the upper inner intake chamber 11 and the upper external discharge chamber 12. A notch 121 is formed between the stop blocks 13, 14 and is communicated with the upper external discharge chamber 12. A plurality of lugs 151, 152, 153 and 154 at different levels are provided at suitable positions on the exterior surface of the upper rotation seat 1. A driving groove 16 is provided at the upper axle hole 10 on the top of the upper rotation seat 1.

The lower rotation seat 2 provided beneath the upper rotation seat 1 is shaped similar to the upper rotation seat 1, and is provided at the center thereof with a lower axle hole 20. A middle intake pipe 211, a discharge pipe 212 and a discharge pipe 213 are provided horizontally at one side on the exterior wall of the lower rotation seat 2. And three air pipes 221, 222, 223 are provided at the other side on the exterior wall of the lower rotation seat 2. An annular air chamber 23 is provided surrounding the lower axle hole 20 and is communicated with the interior of the middle intake pipe 211 through a middle air hole 2110. The annular air chamber 23 is provided at a plurality of suitable positions with three intake pipes 26, 27 and 28 communicated respectively with the interiors of the three air pipes 221, 222, 223. Two discharge chambers 24, 25 are provided at the lateral sides of the lower rotation seat 2 adjacent to the intake pipes 26, and 28 and are communicated with the discharge pipes 212 and 213 through two air holes 2120 and 2130 respectively. Further, two switch seats 291, 292 are symmetrically provided on the lateral sides of the lower rotation seat 2. An air pipe 2115 extending downwards is communicated with the middle intake pipe 211.

There are four micro-switches 31, 32 and 33, 34 appropriately provided on the switch seats 291, 292 respectively and locked with a plurality of locking members 35.

The four micro-switches 31, 32 and 33, 34 are mounted on the lower rotation seat 2, then the upper rotation seat 1 is placed over and mounted on the lower rotation seat 2 to complete the air valve assembly of the present invention. To rotate the upper rotation seat 1 on the lower rotation seat 2, an axle of a motor (not shown) is added externally through the upper axle hole 10 and the lower axle hole 20. And the axle of motor is mounted to make a fixed angle relative to the driving groove 16 of the upper rotation seat 1 to allow rotation of the axle of motor together with the upper rotation seat 1 on the lower rotation seat 2. Also referring to FIG. 4 which is a schematic view showing an air bed 9, the bottom of the air bed 9 is provided with a bottom cushion 94 which is aerated permanently. A plurality of elongate air bladders 91, 92, 93 are mutually parallelly separated and mounted on the bottom cushion 94.

Connecting and operation of the air valve of the present invention are as below: The middle intake pipe 211 is connected exteriorly to a pump (not shown) for air intake. The air pipes 221,222, 223 are connected respectively to the elongate air bladders 91, 92, 93, while the bottom cushion 94 is communicated with the air pipe 2115 on the lower rotation seat 2. That is, the middle intake pipe 211 can always supply air for the bottom cushion 94 through the air pipe 2115 to keep it in an aerated state.

The reason that there are four micro-switches 31, 32 and 33, 34 and four lugs 151, 152, 153 and 154 is for the purpose of controlling rotation and time of stopping of the upper rotation seat 1 in pursuance of a computer software program. Primarily, whenever the lugs 151, 152, 153 and 154 touch the micro-switches 31, 32 and 33, 34 at corresponding levels, themotor stops rotating, say, it stops for an appropriate period of time and then rotates again to proceed the next stroke.

Figure 4:
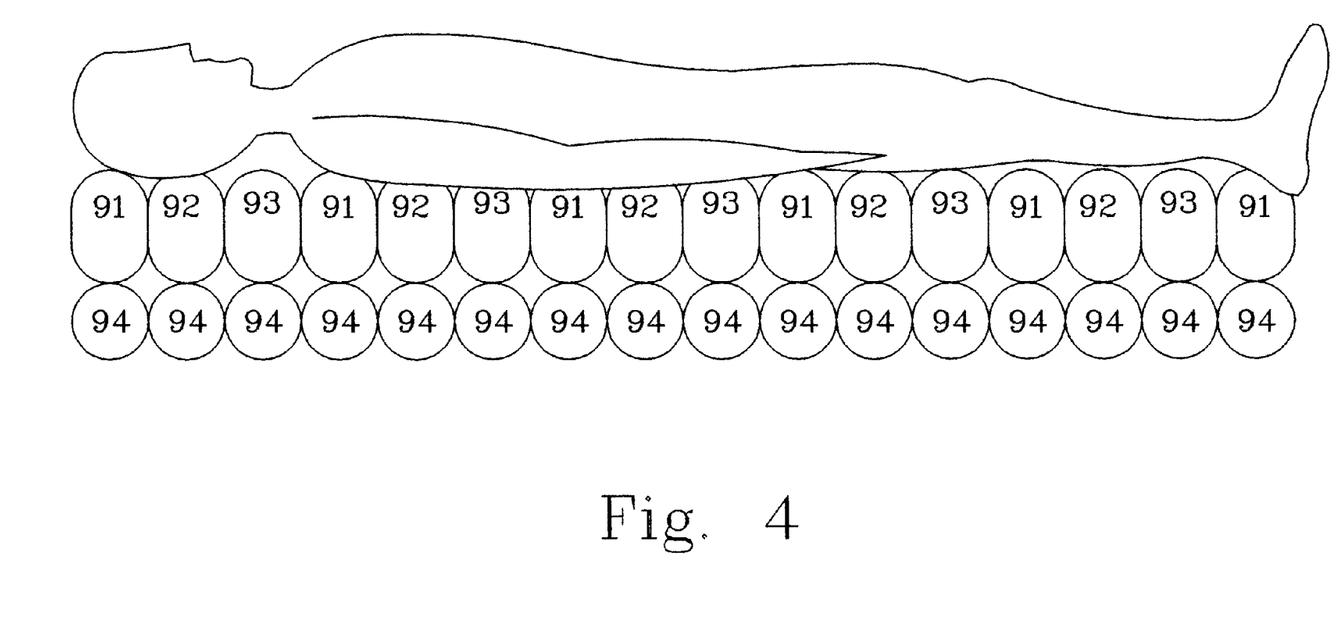
FIG. 4 is a schematic view showing the air bed of FIG. 3.

When the air valve of the present invention is in the state as shown in FIG. 3, intake air flows in the following sequence: it flows from the middle intake pipe 211 through the annular air chamber 23, the three intake pipes 26, 27 and 28, and then flows separately to the air pipes 221, 222, 223. In this way, the elongate air bladders 91, 92, 93 are all supplied with air, such as is shown in FIG. 4, at this time, the discharge pipes 212 and 213 are inactive.

Figure 5:
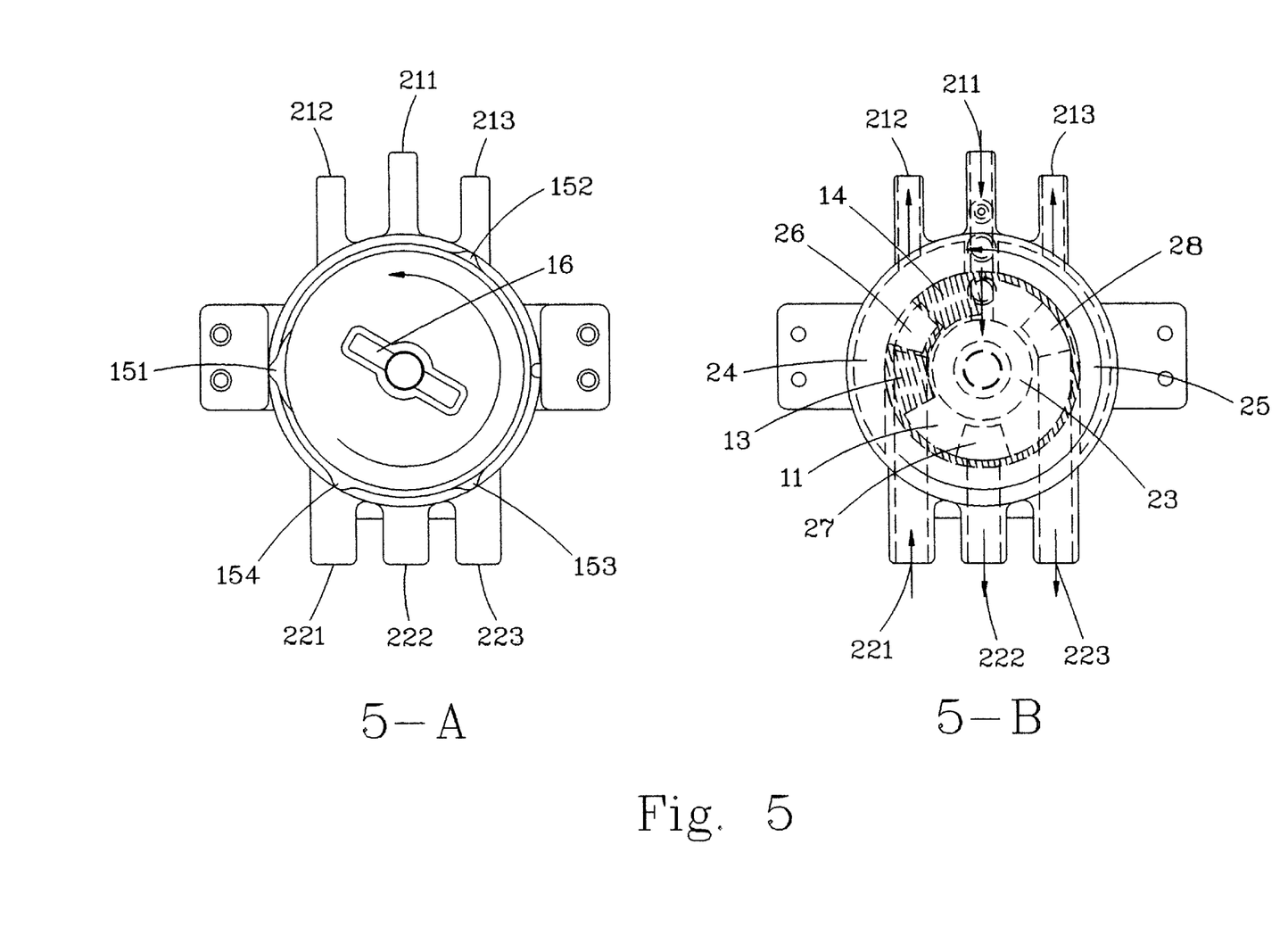
FIG. 5 (including FIGS. 5-1 and 5-2) is another schematic view showing operation of the structure of the present invention.
Figure 6:
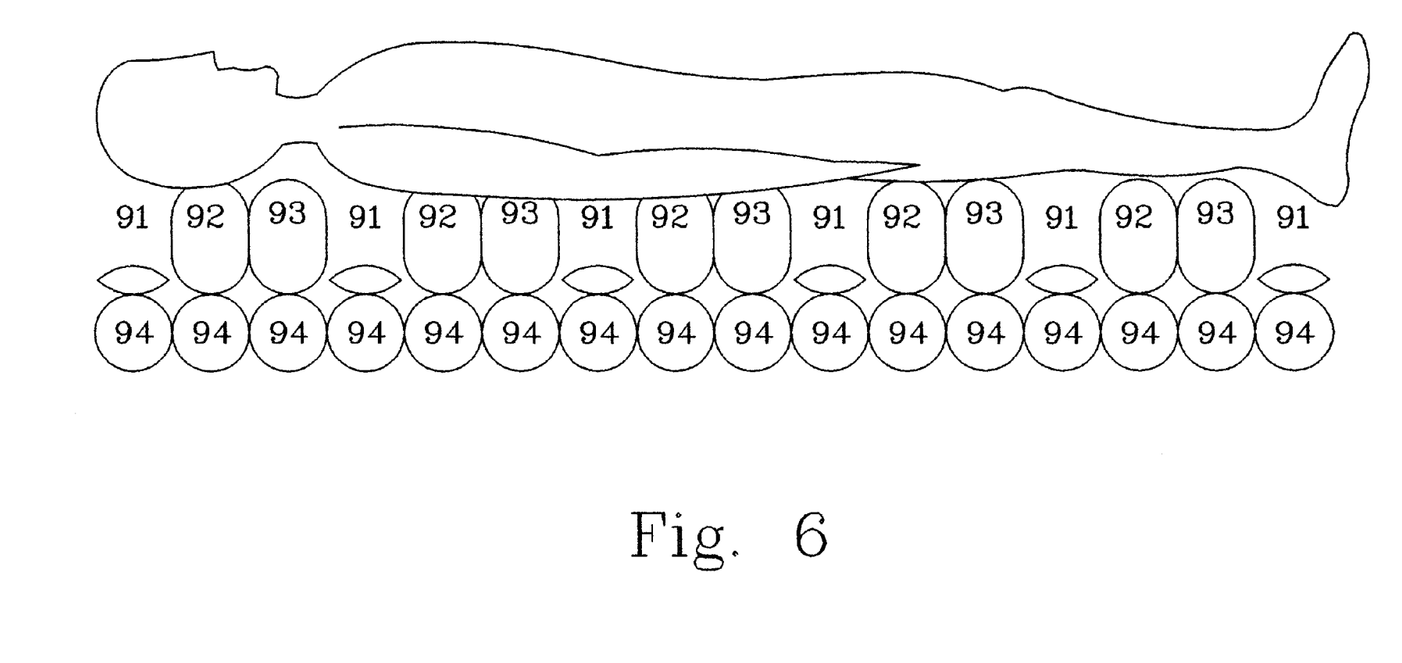
FIG. 6 is a schematic view showing the air bed of FIG. 5.

After a given time period, the upper rotation seat 1 will be activated by the motor to rotate from the position shown in FIG. 3 to that shown in FIG. 5. At this time, intake air flows in the following sequence: it flows from the middle intake pipe 211 through the annular air chamber 23, the upper inner intake chamber 11, the intake pipes 27 and 28, and then flows separately to the air pipes 222, 223. In this way, the elongate air bladders 92, 93 are both supplied with air, while the intake pipe 26 does not have air intake for it is not covered by the upper inner intake chamber 11. The notch 121 on the upper rotation seat 1 laps the intake pipe 26 now. So that air originally in the elongate air bladder 91 flows through the air pipe 221 back to the intake pipe 26, the notch 121, the upper external discharge chamber 12, the discharge chamber 24, 25 and is discharged out of the discharge pipes 212 and 213. Therefore, the elongate air bladder 91 is in the state of discharging, while the elongate air bladders 92, 93 are aerated (as is shown in FIG. 6).

Figure 7:
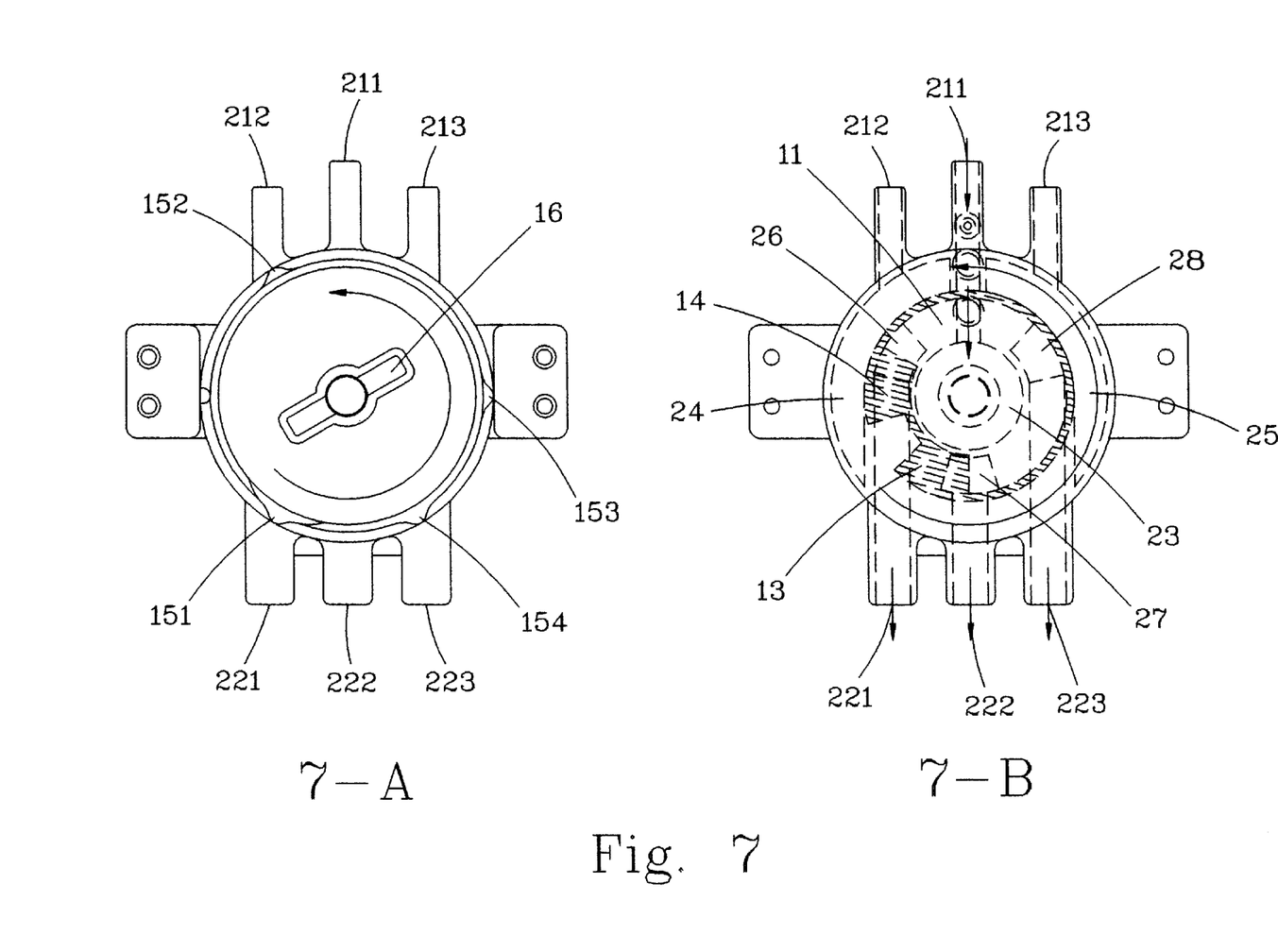
FIG. 7 (including FIGS. 7-1 and 7-2) is another schematic view showing operation of the structure of the present invention.
Figure 8:
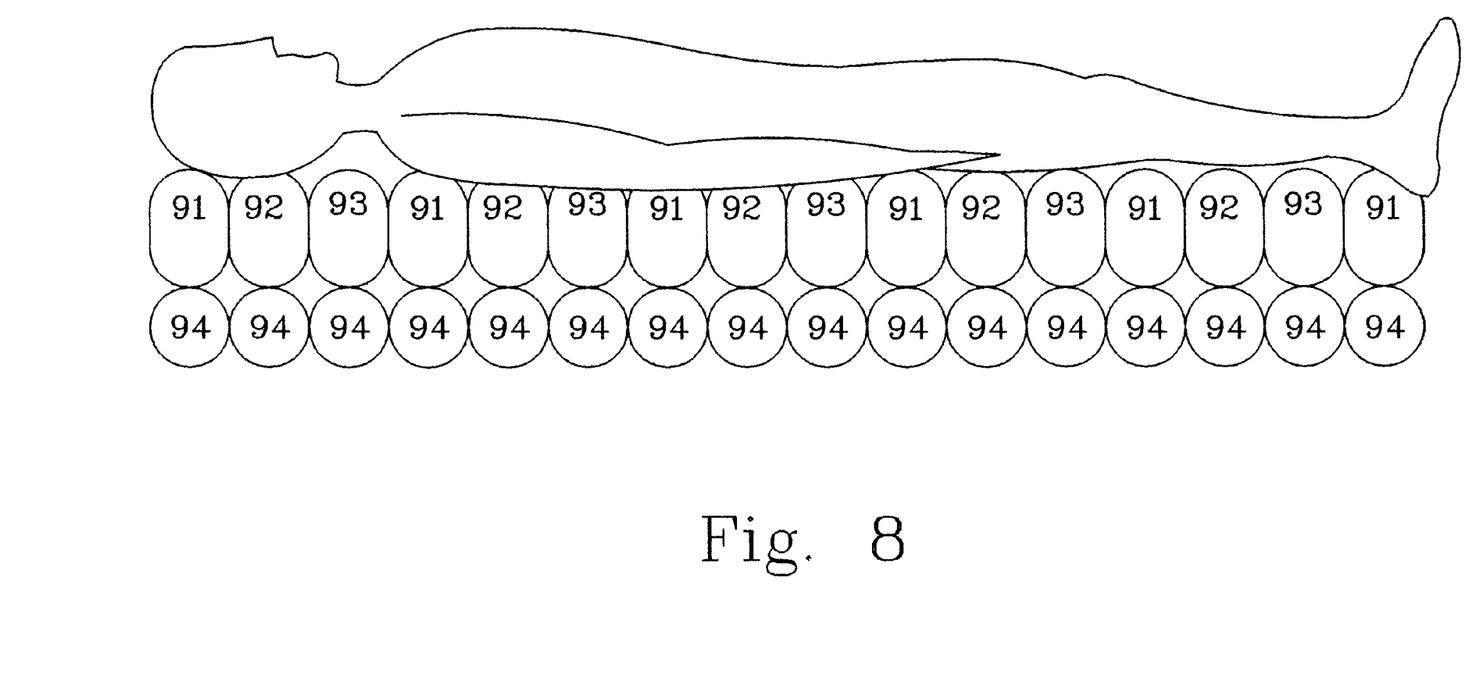
FIG. 8 is a schematic view showing the air bed of FIG. 7.

Further, after a given time period, the upper rotation seat 1 will be activated by the motor to rotate from the position shown in FIG. 5 to that shown in FIG. 7. At this time, intake air flows in the following sequence: it flows from the middle intake pipe 211 through the annular air chamber 23, the upper inner intake chamber 11, the intake pipes 26, 27 and 28, and then flows separately to the air pipes 221, 222, 223. In this way, the elongate air bladders 91, 92, 93 are all supplied with air. This is shown in FIG. 8, the elongate air bladders 91, 92, 93 are all aerated, while the discharge pipes 212 and 213 are inactive.

Figure 9:
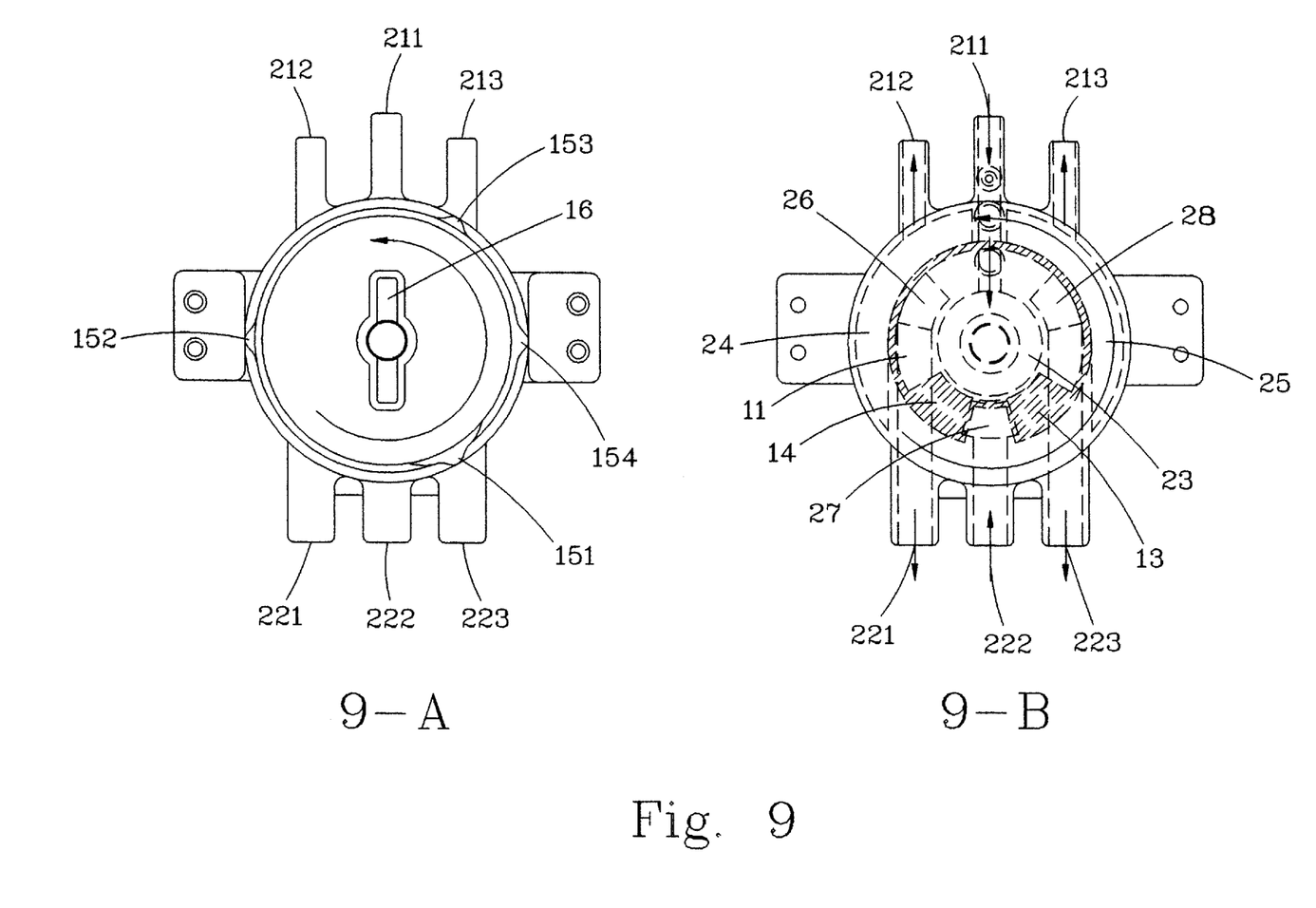
FIG. 9 (including FIGS. 9-1 and 9-2) is a further schematic view showing operation of the structure of the present invention.
Figure 10:
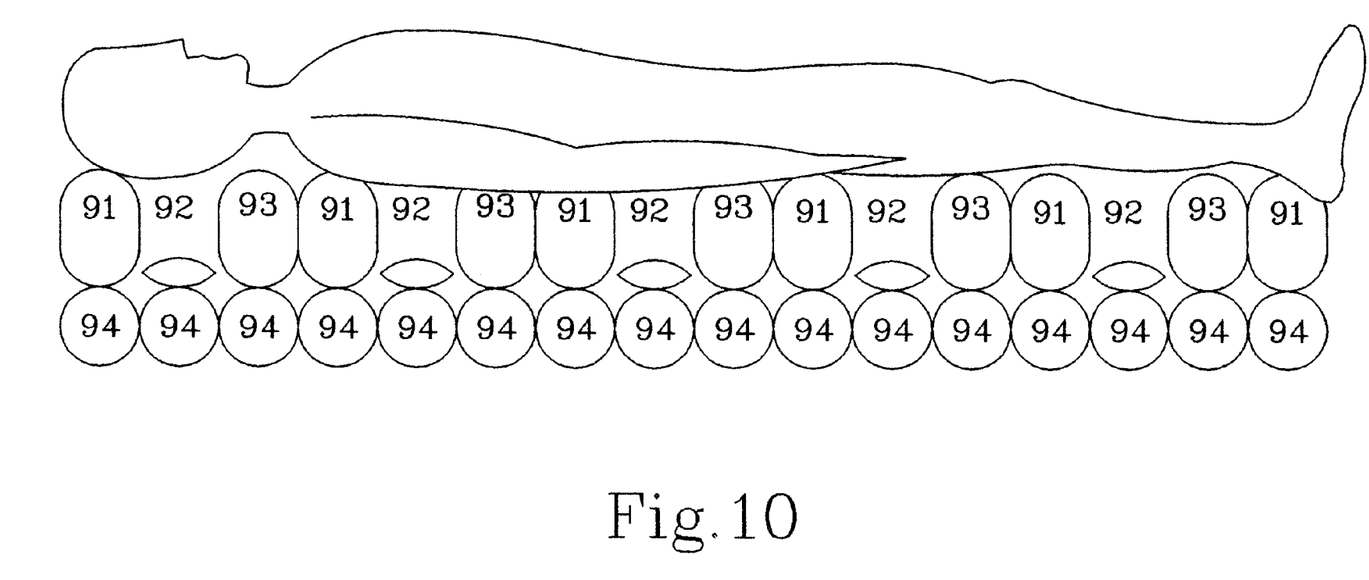
FIG. 10 is a schematic view showing the air bed of FIG. 9.

Further after a given time period, the upper rotation seat 1 will be activated by the motor to rotate from the position shown in FIG. 7 to that shown in FIG. 9. At this time, intake air flows in the following sequence: it flows from the middle intake pipe 211 through the annular air chamber 23, the upper inner intake chamber 11, the intake pipes 26 and 28, and then flows separately to the air pipes 221 and 223. In this way, the elongate air bladders 91 and 93 are both supplied with air, while the intake pipe 27 does not have air intake for it is not covered by the upper inner intake chamber 11. The notch 121 on the upper rotation seat 1 laps the intake pipe 27 now. So that air originally in the elongate air bladder 92 flows through the air pipe 222 back to the intake pipe 27, the notch 121, the upper external discharge chamber 12, the discharge chamber 24, 25 and is discharged out of the discharge pipes 212 and 213. Therefore, the elongate air bladder 92 is in the state of discharging, while the elongate air bladders 91, 93 are aerated (as is shown in FIG. 10).

Figure 11:
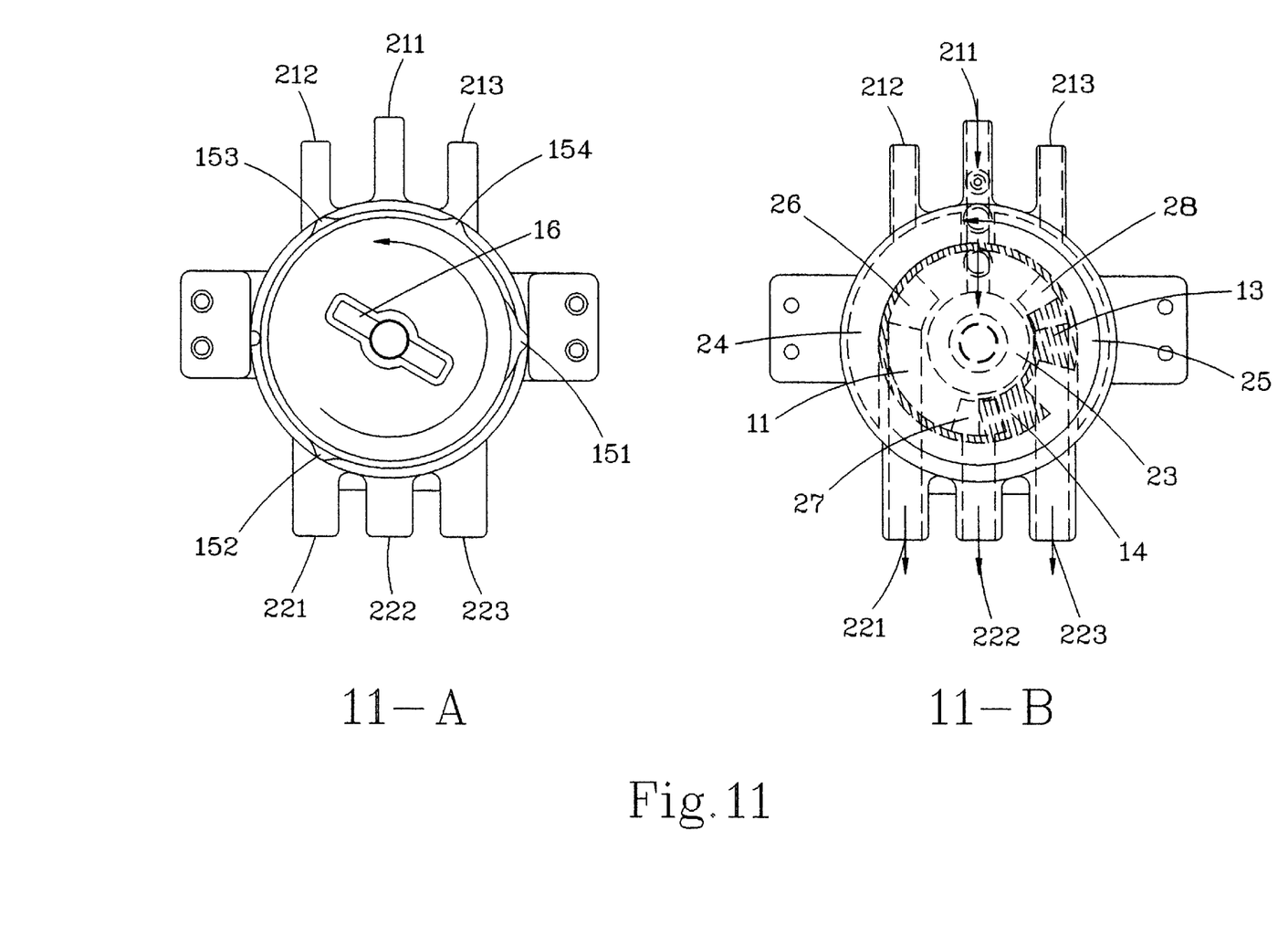
FIG. 11 (including FIGS. 11-1 and 11-2) is a further schematic view showing operation of the structure of the present invention.
Figure 12:
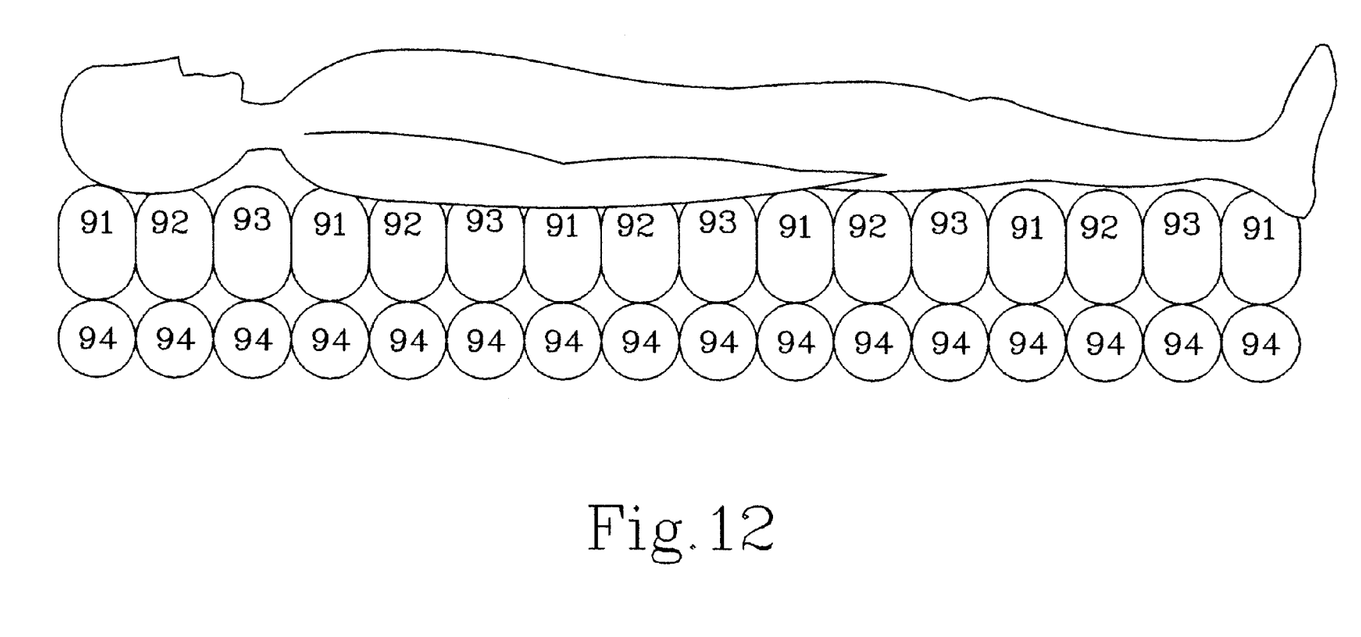
FIG. 12 is a schematic view showing the air bed of FIG. 11.

Again, after a given time period, the upper rotation seat 1 will be activated by the motor to rotate from the position shown in FIG. 9 to that shown in FIG. 11. At this time, intake air flows in the following sequence: it flows from the middle intake pipe 211 through the annular air chamber 23, the upper inner intake chamber 11, the intake pipes 26, 27 and 28, and then flows separately to the air pipes 221, 222, 223. In this way, the elongate air bladders 91, 92, 93 are all supplied with air. This is shown in FIG. 12, the elongate air bladders 91, 92, 93 are all aerated, while the discharge pipes 212 and 213 are inactive.

Figure 13:
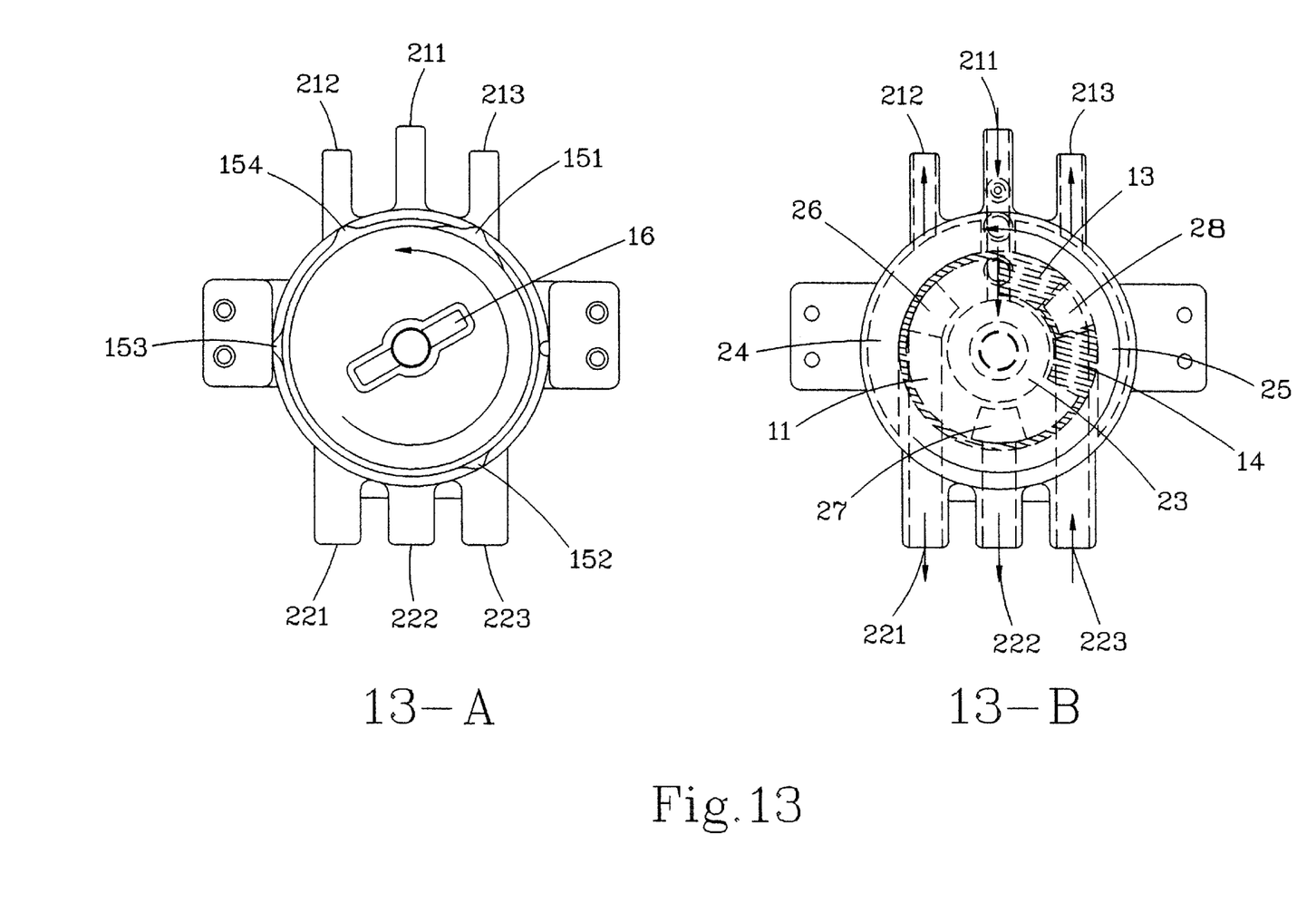
FIG. 13 (including FIGS. 13-1 and 13-2) is another schematic view showing operation of the structure of the present invention.
Figure 14:
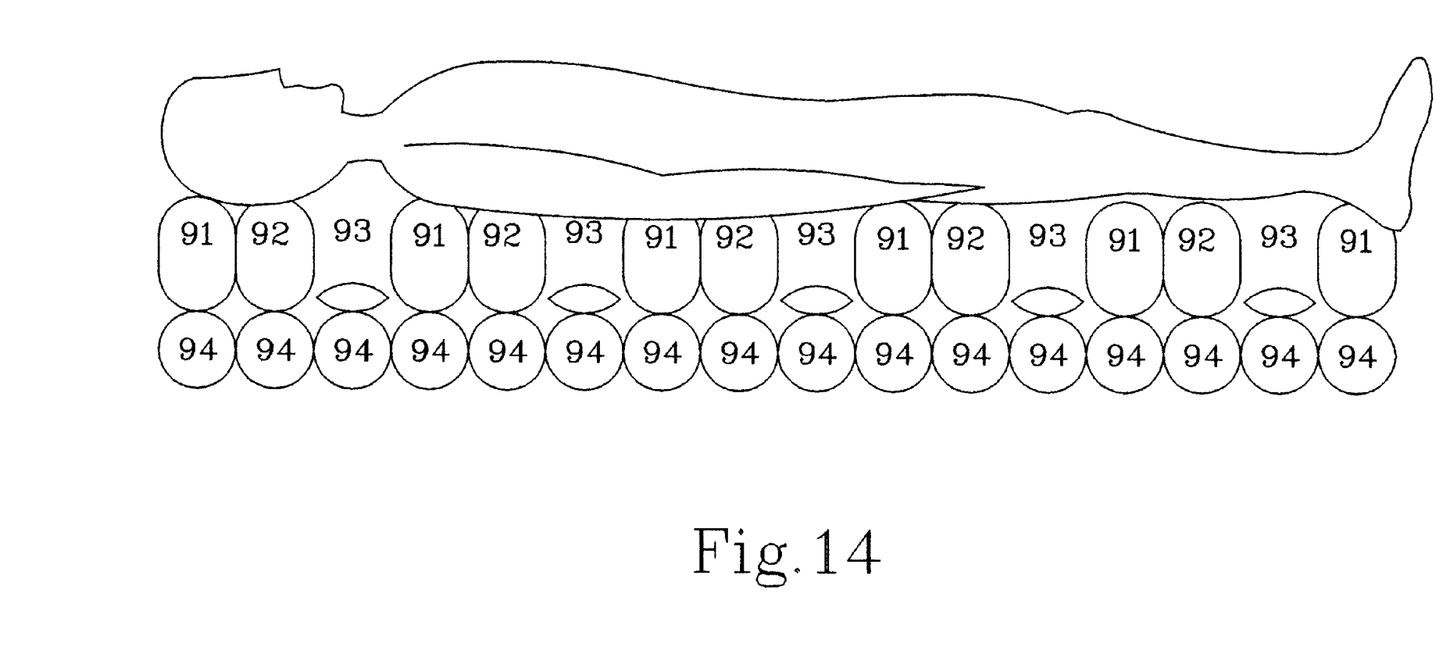
FIG. 14 is a schematic view showing the air bed of FIG. 13.

Further after a given time period, the upper rotation seat 1 will be activated by the motor to rotate from the position shown in FIG. 11 to that shown in FIG. 13. At this time, intake air flows in the following sequence: it flows from the middle intake pipe 211 through the annular air chamber 23, the upper inner intake chamber 11, the intake pipes 26 and 27, and then flows separately to the air pipes 221 and 222. In this way, the elongate air bladders 91 and 92 are both supplied with air, while the intake pipe 28 does not have air intake for it is not covered by the upper inner intake chamber 11. The notch 121 on the upper rotation seat 1 laps the intake pipe 28 now. So that air originally in the elongate air bladder 93 flows through the air pipe 223 back to the intake pipe 28, the notch 121, the upper external discharge chamber 12, the discharge chamber 24, 25 and is discharged out of the discharge pipes 212 and 213. Therefore, the elongate air bladder 93 is in the state of discharging, while the elongate air bladders 91, 92 are aerated (as is shown in FIG. 14).

The sequence of operation as state above can be recurrently continued.

In conclusion, the air valve structure for an alternately aerated three-pipe style air bed of the present invention mainly uses the upper rotation seat 1, the lower rotation seat 2 and a plurality of micro-switches 31, 32 and 33, 34 to get the object of alternate aerating, discharging part of or aerating all the elongate air bladders 91, 92, 93. Such effect can not be achieved with any product existed in the markets. The product of the present invention has never been disclosed in a document or existed in the markets and hence is practical, novel and improved.

Having thus described my invention, what I claim as new and desire to be secured by Letters Patent of the United States are:

1. An air valve structure for an alternately aerated three-pipe style air bed comprising an upper rotation seat, a lower rotation seat and a plurality of micro-switches, wherein, said upper rotation seat is placed over said lower rotation seat, the top of said upper rotation seat is a sealed plane surface and is provided with an upper axle hole, the bottom of said upper axle hole is surrounded by an upper inner intake chamber which is surrounded by an upper external discharge chamber, two stop blocks are provided between said upper inner intake chamber and said external discharge chamber, a notch is formed between said stop blocks and is communicated with said external discharge chamber, a plurality of lugs at different levels are provided at suitable positions on the exterior surface of said upper rotation seat, a driving groove is provided at said upper axle hole on the top of said upper rotation seat;

said lower rotation seat provided beneath said upper rotation seat is provided at the center thereof with a lower axle hole, a middle intake pipe and two discharge pipes are provided horizontally at one side on the exterior wall of said lower rotation seat, and three air pipes are provided at the other side on the exterior wall of said lower rotation seat, an annular air chamber is provided surrounding said lower axle hole and is communicated with the interior of said middle intake pipe through a middle air hole, said annular air chamber is provided at a plurality of suitable positions with three intake pipes communicated respectively with the interiors of said three air pipes, two discharge chambers are provided at the lateral sides of said lower rotation seat adjacent to said intake pipes and are communicated with said discharge pipes through two air holes respectively, further, two switch seats are symmetrically provided on the lateral sides of said lower rotation seat;

four micro-switches are provided on said switch seats respectively and are locked with a plurality of locking members;

said four micro-switches are mounted on said lower rotation seat, then said upper rotation seat is placed over and mounted on said lower rotation seat, an axle of a motor is added externally through said upper axle hole and said lower axle hole to rotate said upper rotation seat on said lower rotation seat, and said axle of motor is mounted to make a fixed angle relative to said driving groove of said upper rotation seat to allow rotation of said axle of motor together with said upper rotation seat on said lower rotation seat;

with this arrangement, three sets of elongate air bladders are mutually separated and connected to said three air pipes, said upper rotation seat is activated by said motor to rotate, in this way, said elongate air bladders are all aerated, or alternately aerated and discharged.

2. An air valve structure for an alternately aerated three-pipe style air bed as stated in claim 1, wherein, when said upper rotation seat rotates, said motor is adapted to be stopped by touching of said lugs with said micro-switches.

3. An air valve structure for an alternately aerated three-pipe style air bed as stated in claim 1, wherein, an air pipe is communicated with said middle intake pipe for communication with a bottom cushion of said air bed.

4. An air valve structure for an alternately aerated three-pipe style air bed as stated in claim 1, wherein, amount of both said micro-switches and lugs is four.

* * * * *